United States Patent
Watts

(10) Patent No.: US 7,072,532 B2
(45) Date of Patent: Jul. 4, 2006

(54) WAVELENGTH INSENSITIVE INTEGRATED OPTIC POLARIZATION SPLITTER

(75) Inventor: Michael R. Watts, Hingham, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/533,372

(22) PCT Filed: Oct. 30, 2003

(86) PCT No.: PCT/US03/34607

§ 371 (c)(1),
(2), (4) Date: Apr. 29, 2005

(87) PCT Pub. No.: WO2004/042430

PCT Pub. Date: May 21, 2004

(65) Prior Publication Data

US 2005/0254128 A1    Nov. 17, 2005

Related U.S. Application Data

(60) Provisional application No. 60/478,767, filed on Jun. 16, 2003, provisional application No. 60/422,413, filed on Oct. 30, 2002.

(51) Int. Cl.
*G02B 6/27* (2006.01)
(52) U.S. Cl. ......................... 385/11; 385/126
(58) Field of Classification Search .................. 385/11, 385/126
See application file for complete search history.

(56) References Cited

U.S. PATENT DOCUMENTS

| 5,133,029 A | 7/1992 | Baran et al. |
| 6,324,312 B1 * | 11/2001 | Liao et al. ............... 385/11 |
| 2006/0018584 A1 * | 1/2006 | Watts et al. ............. 385/11 |

FOREIGN PATENT DOCUMENTS

| EP | 0 202 629 | 11/1986 |
| EP | 0 637 762 | 2/1995 |
| JP | 02023306 | 1/1990 |
| JP | 05066362 | 3/1993 |

OTHER PUBLICATIONS

Garner et al. "Vertiucally Integrated Waveguide Polarization Splitters Using Polymers." IEEE Photonics Technology Letters, vol. 11, No. 7, Jul. 1999.*

(Continued)

*Primary Examiner*—John D. Lee
*Assistant Examiner*—Rhonda S. Peace
(74) *Attorney, Agent, or Firm*—Goodwin Procter LLP

(57) ABSTRACT

An integrated optic polarization splitter, includes a pair of waveguide elements with a first waveguide element having horizontal orientation and a second waveguide element having a vertical orientation formed from a plurality of waveguide core layers. The first and second waveguide elements are intersected or nearly intersected at one end of the structure and separated at the other end of the structure and the transition there between is made to be adiabatic. The waveguide elements receive an optical signal having both a TE component and a TM component. The TE component propagates along the horizontally oriented waveguide element and the TM component propagates along the vertically oriented waveguide element.

13 Claims, 10 Drawing Sheets

OTHER PUBLICATIONS

Ridder, et al. "An Integrated Optic Adiabatic TE/TM Mode Splitter on Silicon," *Journal of Lightwave Technology*, Vo. 11, No. 11, Nov. 1993, pp. 1806-1811.

Watts, et al., "Polarization splitting and rotating through adiabatic transitions," *Proceedings of Integrated Photonics Reseach Conference 2003*, pp. 26-28, Jun. 2003.

Fimmwave by Photon Design., from website: http://www.photond.com/products/fimmwave/fimmwave1.htm, (printed Sep. 8, 2005).

M.R. Watts, "Wavelength switching and routing through evanescently induced absorption," Master's thesis, Massachusetts Institute of Technology (Jun. 2001).

* cited by examiner

WAVELENGTH INSENSITIVE INTEGRATED OPTIC POLARIZATION SPLITTER

PRIORITY INFORMATION

This application is the U.S. national stage application of International (PCT) Patent Application Ser. No. PCT/US2003/034607, filed Oct. 30, 2003, which claims priority from provisional application Ser. Nos. 60/422,413, filed Oct. 30, 2002, and 60/478,767, filed Jun. 16, 2003. The disclosures of these three applications are incorporated herein by reference in their entirety.

BACKGROUND OF THE INVENTION

The invention relates to the field of integrated optic polarization splitters, and in particular to an integrated optic polarization splitter based on the intersection or near intersection of horizontally and vertically oriented waveguides.

As the prevalence of fiber optic communication grows, the demand for more intricate processing of optical signals continues to increase. Since integrated optic devices allow for integration of many optical functions on a chip, integrated optic approaches will likely fill the demand for more intricate optical signal processing. However, in order to improve the functionality and reduce the cost per function the density of components on the chip must increase.

For a given wavelength, the confinement of a mode in a dielectric waveguide is determined by the contrast between the core and cladding indices, the higher the contrast, the tighter the confinement. An outgrowth of tighter confinement is the ability to pack waveguides closer together and guide light around sharper bends without substantial radiative loss. Since these are the two most critical parameters affecting device density, it can generally be said that the higher the index contrast the greater the device density. However, as the index contrast increases, the transverse electric (TE) and transverse magnetic (TM) modes propagating in the waveguides begin to exhibit different characteristics. While in a straight section of a square waveguide, the TE and TM modes propagate at the same rate, in a bend the TE and TM modes propagate at substantially different rates. And, when a pair of square high index contrast (HIC) guides is coupled, the TE and TM modes tend to couple at different rates. Since most integrated optic components are sensitive to both propagation velocity and guide-to-guide coupling, these effects result in polarization dependent performance, a result that is not compatible with the random polarization state emanating from the standard single mode fiber used in telecom applications.

One way to compensate these effects is to use a rectangular waveguide geometry and alter the aspect ratio of the guide to compensate for the natural difference in propagation around a bend and/or equalize the guide-to-guide coupling. However, while one or the other of these effects may be compensated in this manner for a particular device, as the index contrast increases it becomes difficult if not impossible to compensate both simultaneously in a manner that applies to all devices on the chip.

Another approach for overcoming the polarization sensitivity of HIC integrated optics is to split the random input polarization emanating from the single mode (SM) fiber with a polarizing beam splitter (PBS), couple the outputs to polarization maintaining (PM) fibers, twist one of these PM fibers by 90° degrees and couple the two fibers to separate paths on the integrated optic chip. On each of these paths identical structures are used to process the two components independently. At the output, these components are recombined by coupling to another pair of PM fibers, twisting the PM fiber of the path that had not previously been twisted and coupling both fibers to another PBS which has a SM fiber output. While such an approach, commonly referred to as a "polarization diversity" scheme, is feasible, when implemented with bulk optics it is also cumbersome. Aligning PM fibers is difficult and expensive. And, in order to preserve signal integrity the path lengths must be matched to within at least one-tenth of a bit length (i.e. ~2 mm for 10 Gb/s signals and ~0.5 mm for 40 Gb/s signals assuming an index of 1.5).

A better approach is to integrate the splitting function of the PBS and the rotating function of the twisted PM fiber onto the integrated optic chip. Doing so would eliminate the need to align PM fibers and path lengths could be matched easily through lithography.

Several integrated optic polarization splitters and rotators (or converters) have been proposed. However, most of the devices proposed to date rely on the coupling of a pair of waveguide modes. Devices based on coupled modes generally exhibit a wavelength sensitivity resulting from differences in the dispersion of the super-modes propagating in the structure. Further, such approaches are very sensitive to fabrication errors. Even slight changes in the waveguide geometries or separation can have a significant impact on the device performance.

A better way to form a polarization splitter or rotator is to use the principle of mode evolution. By making gradual (or adiabatic) changes to the waveguide geometry, the modes in the guide can be conditioned and the polarization states separated or rotated. Such an approach only requires that the modes not exchange power which can be assured by proper design of the waveguide and a slow evolution of the structure. Since prevention of mode coupling is a relatively loose requirement, devices based on mode evolution tend to be wavelength insensitive and fabrication tolerant. It has been proposed and demonstrated that a polarization splitter based on mode evolution can be formed, however, this approach has the disadvantage of requiring multiple waveguide materials.

Generally, it is the object of the present invention to split polarization states with an integrated optic device based on the principle of mode evolution.

It is a further object of the present invention that when run in reverse the device operate as a polarization combiner.

It is yet another object of the present invention that the device be wavelength insensitive, tolerant to fabrication errors, and require only a single material system to construct.

These and other objects of the present invention will become apparent to those skilled in the art from the following detailed description and accompanying figures.

SUMMARY OF THE INVENTION

According to one aspect of the invention, there is provided an integrated optic polarization splitter. The polarization splitter includes an input waveguide element that inputs an optical signal having TE and TM components. A vertically oriented waveguide element which includes a plurality of core layers is coupled to the input waveguide element and propagates the TM component of the optical signal. A horizontally oriented waveguide element is coupled to the input waveguide element and propagates the TE component of the optical signal.

According to another aspect of the invention, there is provided a method of forming an integrated optic polarization splitter. The method includes providing an input waveguide element that inputs an optical signal having TE and TM components. Moreover, the method includes forming a vertically oriented waveguide element that is coupled to the input waveguide element and propagates the TM component of the optical signal. The vertically oriented waveguide element includes a plurality of core layers. Furthermore, the method includes forming a horizontally oriented waveguide element that is coupled to the input waveguide element that propagates the TE component of the optical signal.

According to another aspect of the invention, there is provided an integrated optic polarization splitter. The integrated optic polarization splitter includes a pair of waveguide elements with a first waveguide element having a horizontal orientation and a second waveguide element having a vertical orientation formed from a plurality of waveguide core layers. The first and second waveguide elements are intersected or nearly intersected at one end of the structure and separated at the other end of the structure so that the transition is made to be adiabatic. The waveguide elements receive an optical signal having both a TE component and a TM component. The TE component propagates along the horizontally oriented waveguide element and the TM component propagates along the vertically oriented waveguide element.

DETAILED DESCRIPTION OF THE INVENTION

Figure 1:
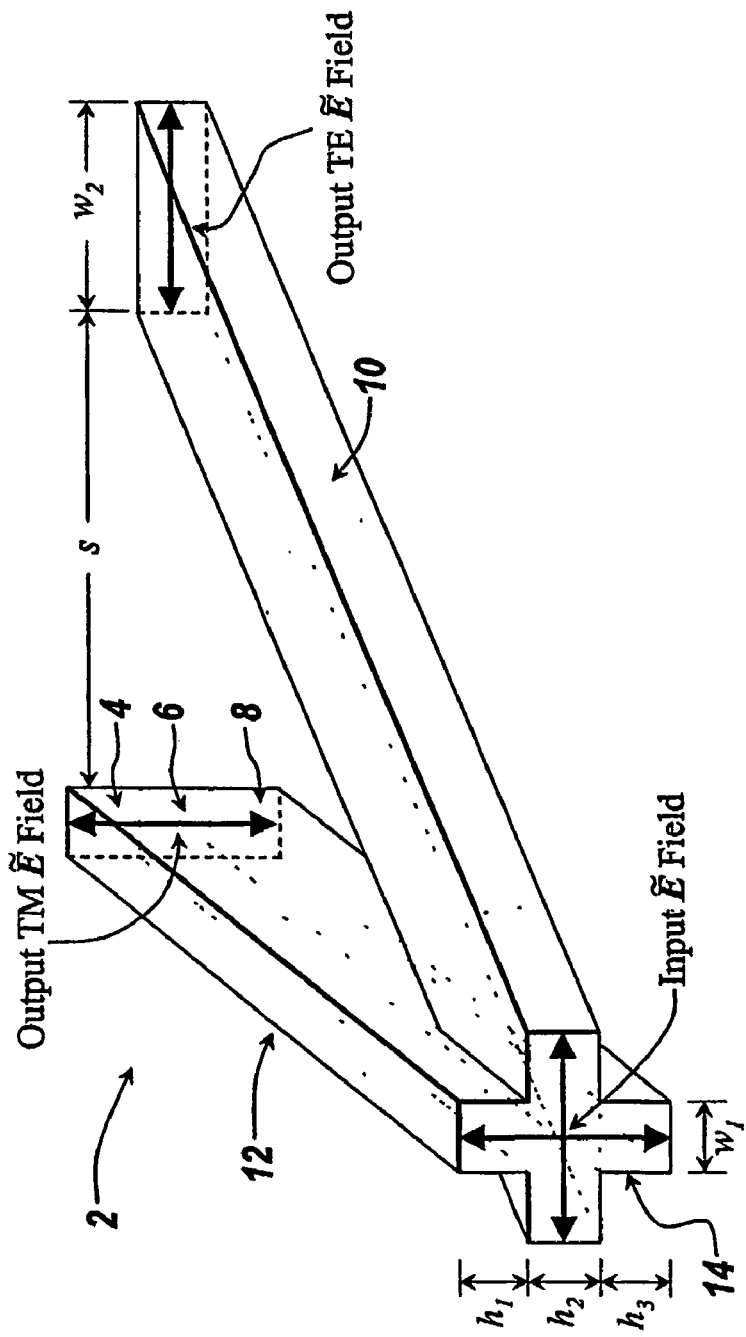
FIG. 1 is a schematic diagram of a polarization splitter in accordance with the invention.

The polarization splitter of the invention is constructed from the intersection or near intersection of a pair of waveguides. The zone in which the waveguides are in closest proximity is the splitter input and the zone in which they are at their greatest separation is the splitter output. For the device to efficiently separate the polarization states, the fundamental TE (or quasi TE) mode of the combined structure at the device input must evolve into the fundamental mode of one of the guides, denoted the TE guide, while the fundamental TM (or quasi TM) mode evolves into the fundamental mode of the other guide, denoted the TM guide. For this to occur, the TM mode of the TM guide must be more strongly guided (have a higher effective index) than the TM mode of the TE guide. Similarly, the TE mode of the TE guide must be more strongly guided than the TE mode of the TM guide.

The evolution of the waveguide acts as a perturbation to the mode structure inducing coupling amongst the modes in the system, the faster the evolution, the stronger the coupling. In order to ensure that the structure acts as a polarization splitter, coupling amongst the fundamental modes and between the fundamental modes and other modes in the system must be inhibited. The full spectrum of modes in the structure consists of the fundamental guided TE and TM modes, unguided (or radiation) modes, and secondary guided TE and TM modes that appear as the horizontally and vertically oriented sections separate. The unguided modes propagate at substantially faster rates than the fundamental modes. As a result, when the transition is sufficiently weak, the modes have a chance to de-phase before substantial power exchange occurs. Therefore, power exchange between fundamental modes and radiation modes can be substantially reduced by making the transition slow (or adiabatic). Coupling between fundamental modes and secondary guided modes can be similarly inhibited by ensuring that the secondary modes also propagate at substantially higher rates. This can be done by forming the structure from a pair of guides with principal axes that are orthogonally oriented. In the electromagnetic sense, the principal axis is defined by the electric field polarization of the fundamental mode of the waveguide. For a rectangular buried waveguide, the principal axis is along the larger of the two dimensions that define the rectangle. In the present description, when specifying an orientation of a waveguide, reference is made to the principal axis of the waveguide. For example, the expression "vertically oriented waveguide section" is meant to indicate a waveguide section having a principal axis that is vertical, i.e., orthogonal to a main planar surface (such as the substrate surface) of the waveguide device, while the expression "horizontally oriented waveguide section" is meant to indicate a waveguide section having a principal axis that is horizontal, i.e., parallel to a main planar surface (such as the substrate surface) of the waveguide device.

Finally, coupling amongst the fundamental modes can be inhibited by further ensuring that the fundamental modes propagate at different rates and/or by positioning the guides in such a manner to prevent coupling through mode symmetry.

As a final generality it is important to note that a device which acts as an effective polarization splitter, will through the principle of reciprocity, act as an effective polarization combiner when run in reverse.

Practical implementations of the device typically require that it be formed from micro-fabrication techniques, which generally require the structures be formed from a layering process with features defined through lithography. It is therefore desirable to build the structure with as few layers as possible. Herein, a layer is defined as a horizontal slice through the waveguide cross-section which contains no variations of refractive index in the vertical direction.

The optical waveguides forming the inventive polarization splitter are typically formed by dielectric materials of various refractive indices. Generally, the higher index materials are considered core materials while the lower index materials are considered cladding materials. To be specific, a cladding material is herein defined as the material of lowest refractive index within a layer. All other materials within the layer are therefore core materials. A core layer is defined as a layer containing a core material.

The basic requirements for the structure to operate as a polarization splitter are quite loose, with the primary requirement being that the structure be formed from the intersection or near intersection of a pair of orthogonally oriented waveguides which separate thereby splitting the orthogonally oriented modes into the respective orthogonally oriented waveguide sections. A few of the possible geometries are described below.

FIG. 1 is a schematic diagram of a polarization splitter 2 in accordance with the invention. The splitter 2 begins as a pair of orthogonally oriented rectangular waveguides 14 which are centrally intersected and then gradually separated into a pair of rectangular waveguides 10, 12, one with a horizontal orientation 10, and the other with a vertical orientation 12, with a final separation of s as shown in FIG. 1. A cladding, with a lower refractive index than the core layers typically surrounds the core layers to provide light confinement. The polarization splitter in FIG. 1 uses centrally intersected waveguides to inhibit coupling amongst the fundamental guided modes. As a result, the structure will typically require a minimum of three core layers 4, 6, and 8 with heights $h_1$, $h_2$, and $h_3$ where $h_1$ and $h_3$ are preferably designed to be equal. The horizontally oriented waveguide 10 has a width $w_2$ and height $h_3$, and the vertically oriented waveguide 12 has a width $w_1$ and height that is the sum of $h_1$, $h_2$, and $h_3$. At the input of the polarization splitter only two guided modes exist, a fundamental TE mode and a fundamental TM mode. At large separations of the horizontally oriented and vertically oriented sections, the fundamental TE mode is almost entirely confined to the horizontally oriented section and the fundamental TM mode is confined to the vertically oriented section. Thus, the natural evolution of the fundamental modes results in a splitting of the TE and TM components.

It is important to note that many variations of the described embodiment are possible. The waveguides need not be rectangular in geometry and the core layers need not have the same refractive indices or geometry.

Figure 2A:
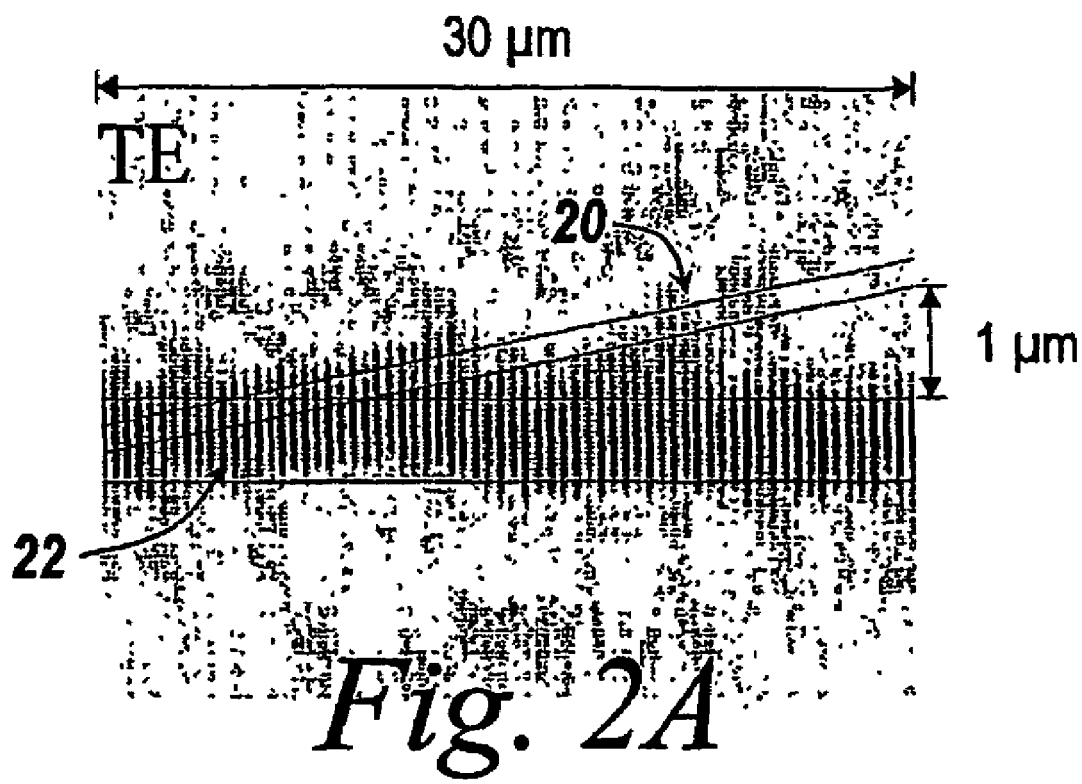
FIGS. 2A–2B are schematic diagrams of mode scattering calculations of the TE and TM fields propagating in the polarization splitter depicted in FIG. 1.
Figure 2B:
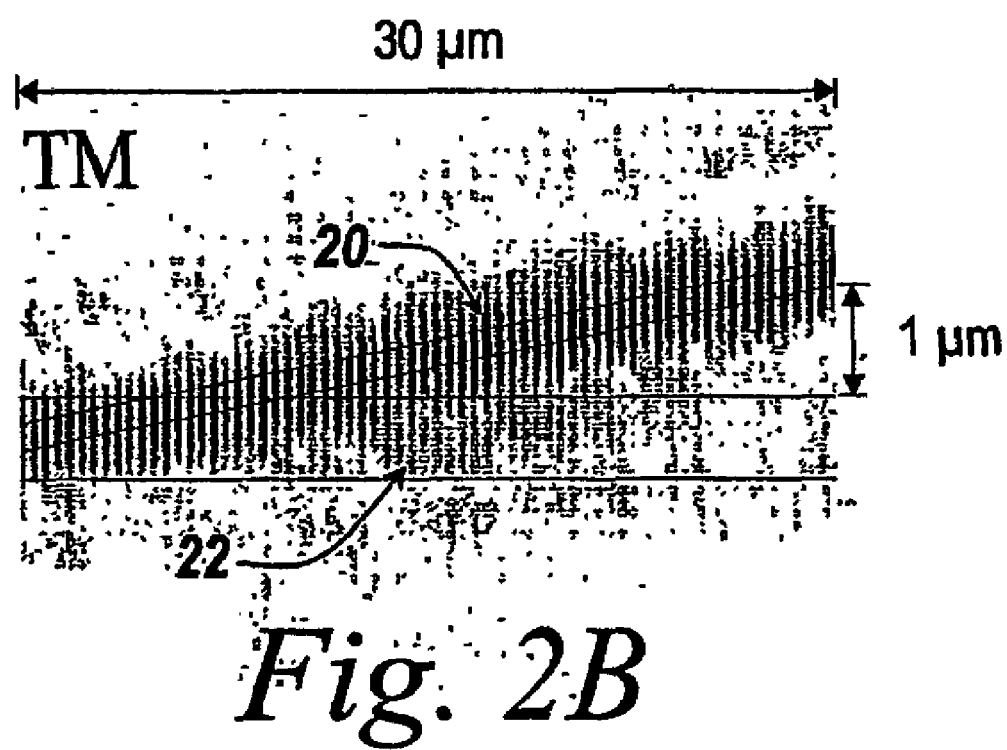

FIGS. 2A–2B are schematic diagrams of mode-scattering simulations of TE and TM fields propagating in the polarization splitter of FIG. 1. The mode scattering technique takes overlaps between the local modes at each cross-section along the length of the structure and propagates the field between cross-sections. Since a reduced set of modes are typically used to minimize the calculation time, mode scattering simulations are a particularly useful modeling tool only when a few modes per waveguide cross-section are required to represent the system. Since the radiation modes do not substantially influence the operation of approaches based on mode evolution, the mode-scattering technique is well suited for these problems. In the embodiment used for these simulations, the core refractive index is 2.2 and the cladding index is 1.445. The dimensions of the horizontally and vertically oriented waveguide cores are 0.25×0.75 µm and 0.75×0.25 µm, respectively, indicating a layer thickness of 0.25 µm. The length of the splitter is 30 µm and the distance separating the horizontally oriented rectangular waveguide 22 and vertically oriented rectangular waveguide 20 is 1 µm at the device output. However, other dimensions can be used in other embodiments.

FIG. 2A shows the TE field propagating in the splitter 2. In particular, the TE field propagates in the horizontally oriented rectangular waveguide 22 and not the vertically oriented rectangular waveguide 20.

FIG. 2B shows the TM field propagating in the splitter. The TM field propagates in the vertically oriented rectangular waveguide 20 and not the horizontally oriented rectangular waveguide 22. Thus, FIGS. 2A–2B demonstrate the ability of the splitter to separate TE and TM components of a randomly polarized input signal.

Figure 3A:
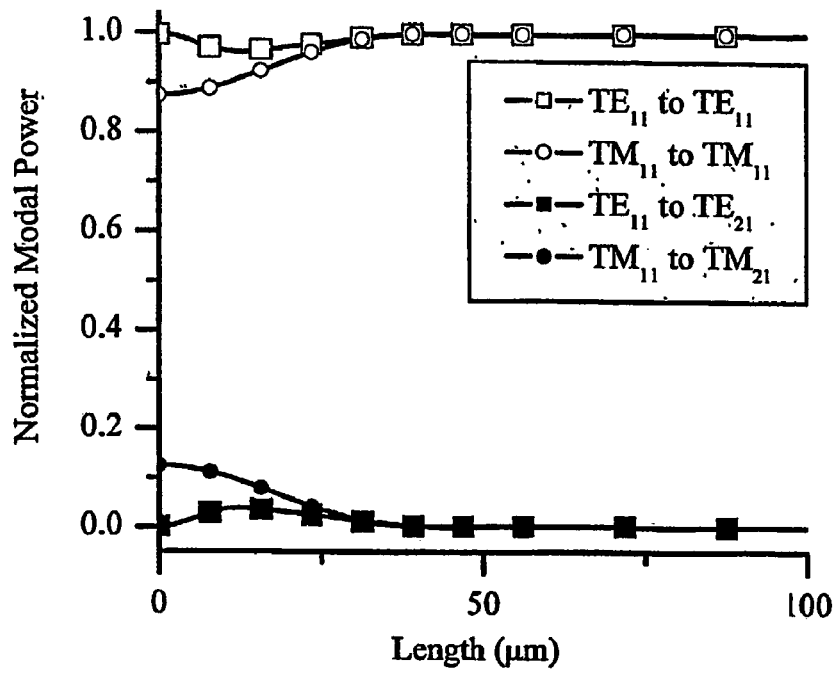
FIGS. 3A–3B are graphs demonstrating the performance of the polarization splitter depicted in FIG. 1.
Figure 3B:
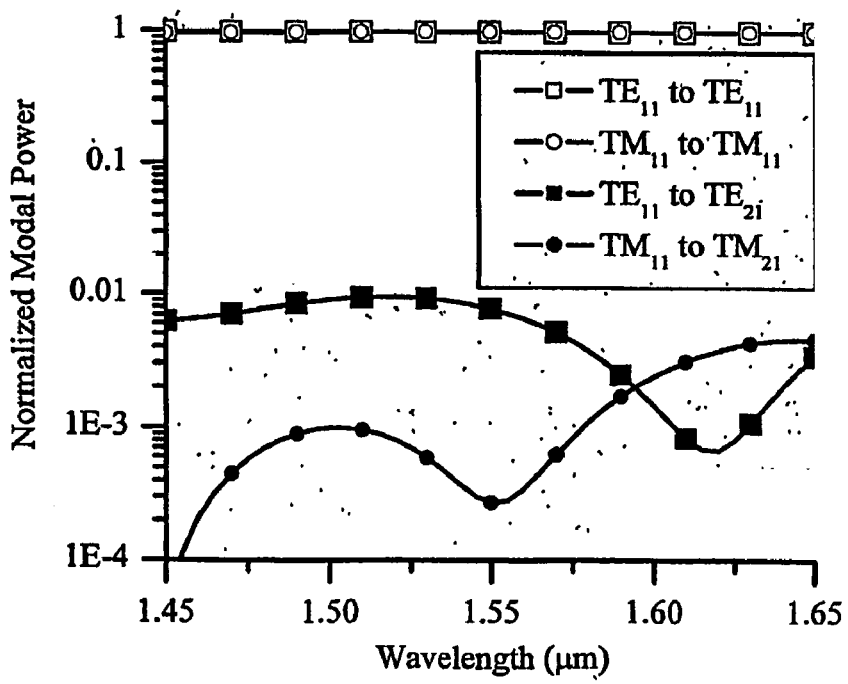

FIGS. 3A–3B are graphs of mode-scattering and full three dimensional finite difference time domain (FDTD) simulations, respectively, demonstrating the performance of the polarization splitter depicted in FIG. 1. Here again, the core refractive index is 2.2 and the cladding index is 1.445. The dimensions of the waveguide cores are 0.25×0.75 µm and 0.75×0.25 µm, respectively, indicating a layer thickness of 0.25 µm. The waveguide elements are separated at the output by a distance s=1 µm. FIG. 3A shows the relationship between the length of the inventive polarization splitter and the normalized output modal power for the TE and TM modes. In particular, FIG. 3A shows that for lengths that are larger than 25 µm, the normalized output modal power for both the $TE_{11}$ (fundamental TE) mode and $TM_{11}$ (fundamental TM) modes are nearly 1 with very little cross-talk ($TE_{11}$ to $TE_{21}$ and $TM_{11}$ to $TM_{21}$ coupling) over the entire 1.45 µm to 1.65 µm band. The performance of the inventive splitter improves as the transition becomes more adiabatic.

FIG. 3B demonstrates the wavelength insensitive nature of the device from 1.45 µm to 1.65 µm) which includes the telecom wavelengths using a full three-dimensional FDTD simulation. The FDTD method is a numerical implementation of Maxwell's equations with the only errors being those caused by the grid discretization. In contrast to the mode-scattering technique all modes of the system are taken into account. For the present simulation the device length is 25 µm. In this range, the normalized output modal power for both the $TE_{11}$ mode and $TM_{11}$ modes are nearly 1 with very little cross-talk ($TE_{11}$ to $TE_{21}$ and $TM_{11}$ to $TM_{21}$ coupling) over the entire 1.45 µm to 1.65 µm band. This indicates that the inventive splitter device does not possess any significant wavelength sensitivity in the telecom wavelength regime.

Figure 4A:
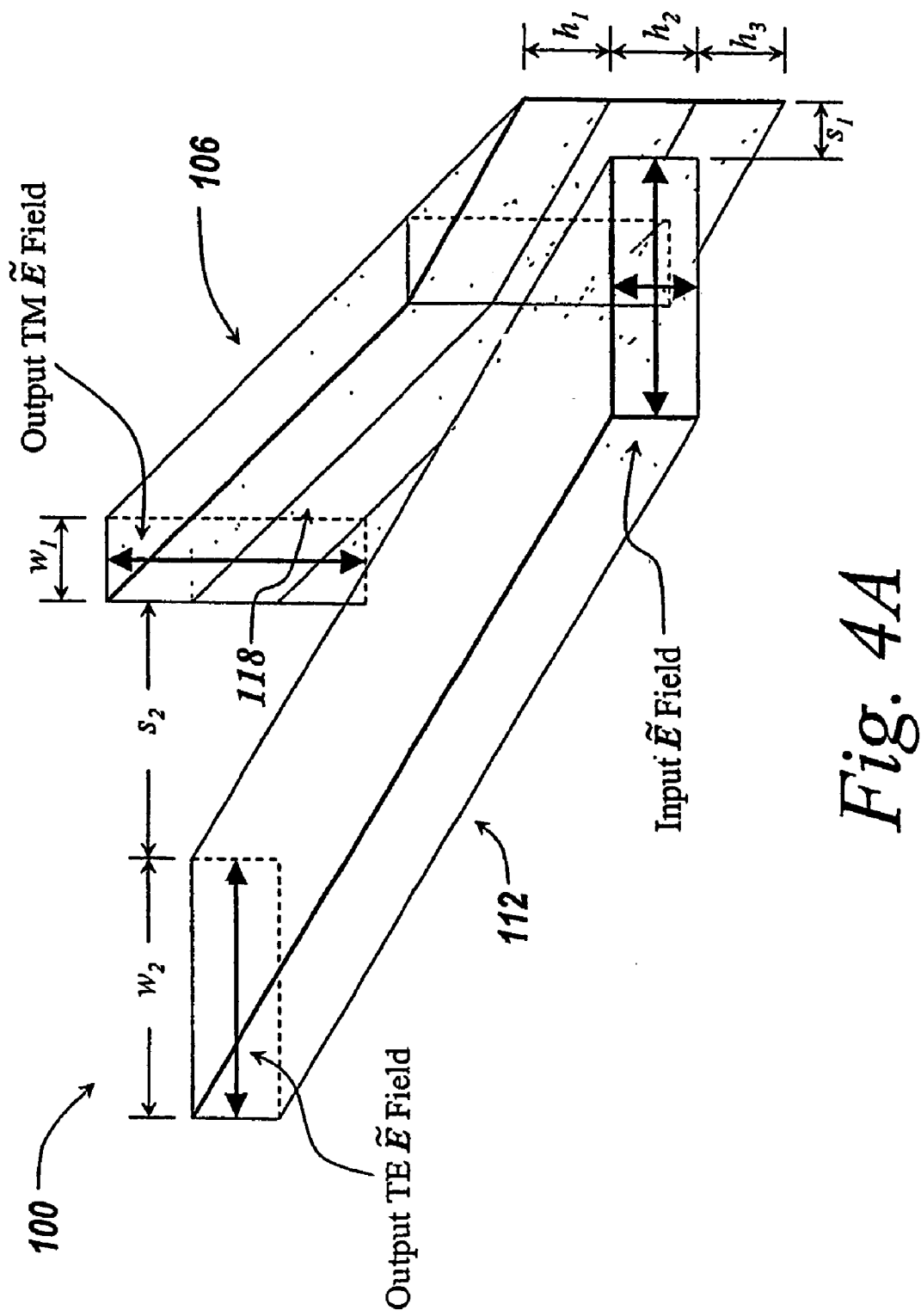
FIGS. 4A–4C are schematic diagrams of polarization splitters utilizing three core layers with a gap between the middle core layers of the vertically and horizontally oriented waveguide elements.
Figure 4B:
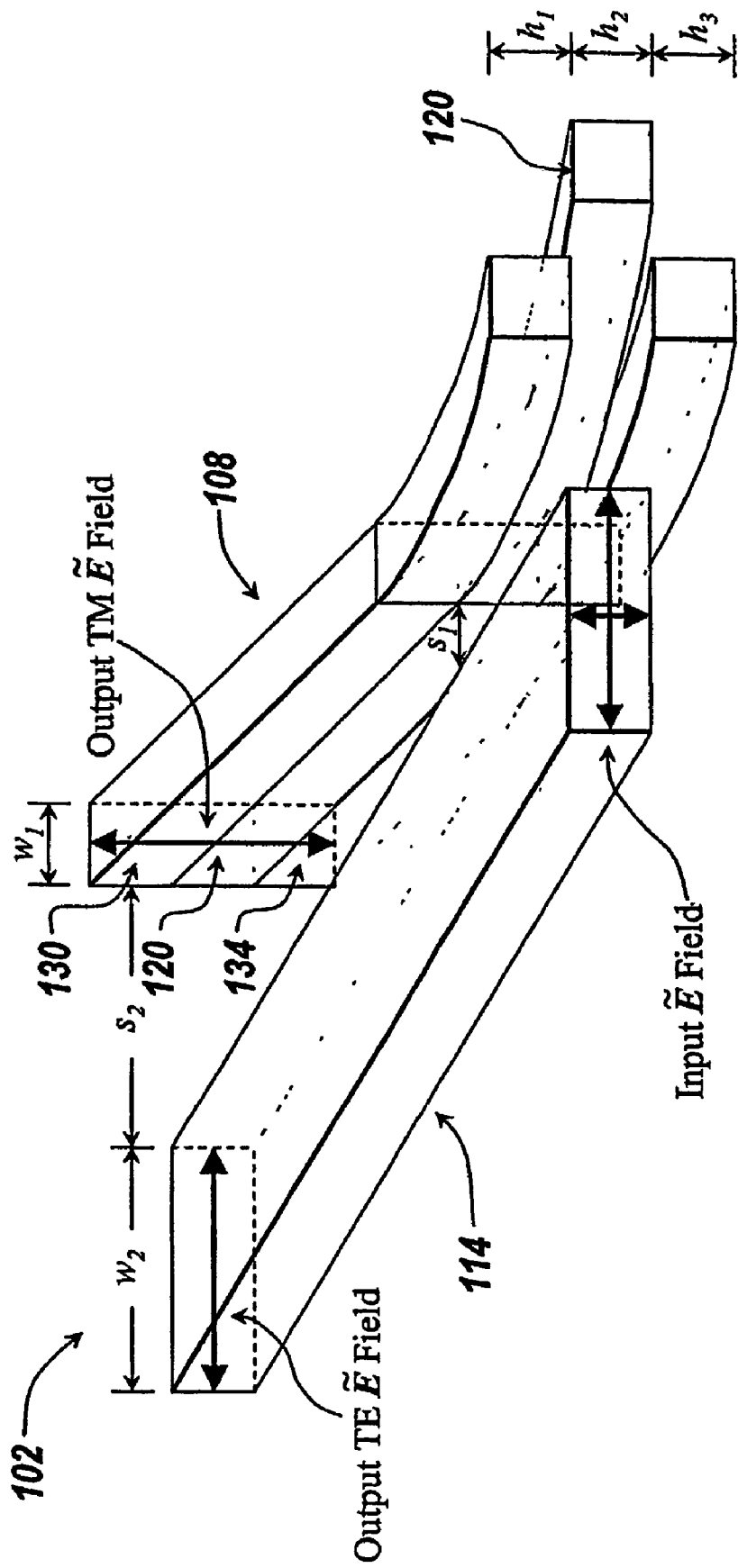
Figure 4C:
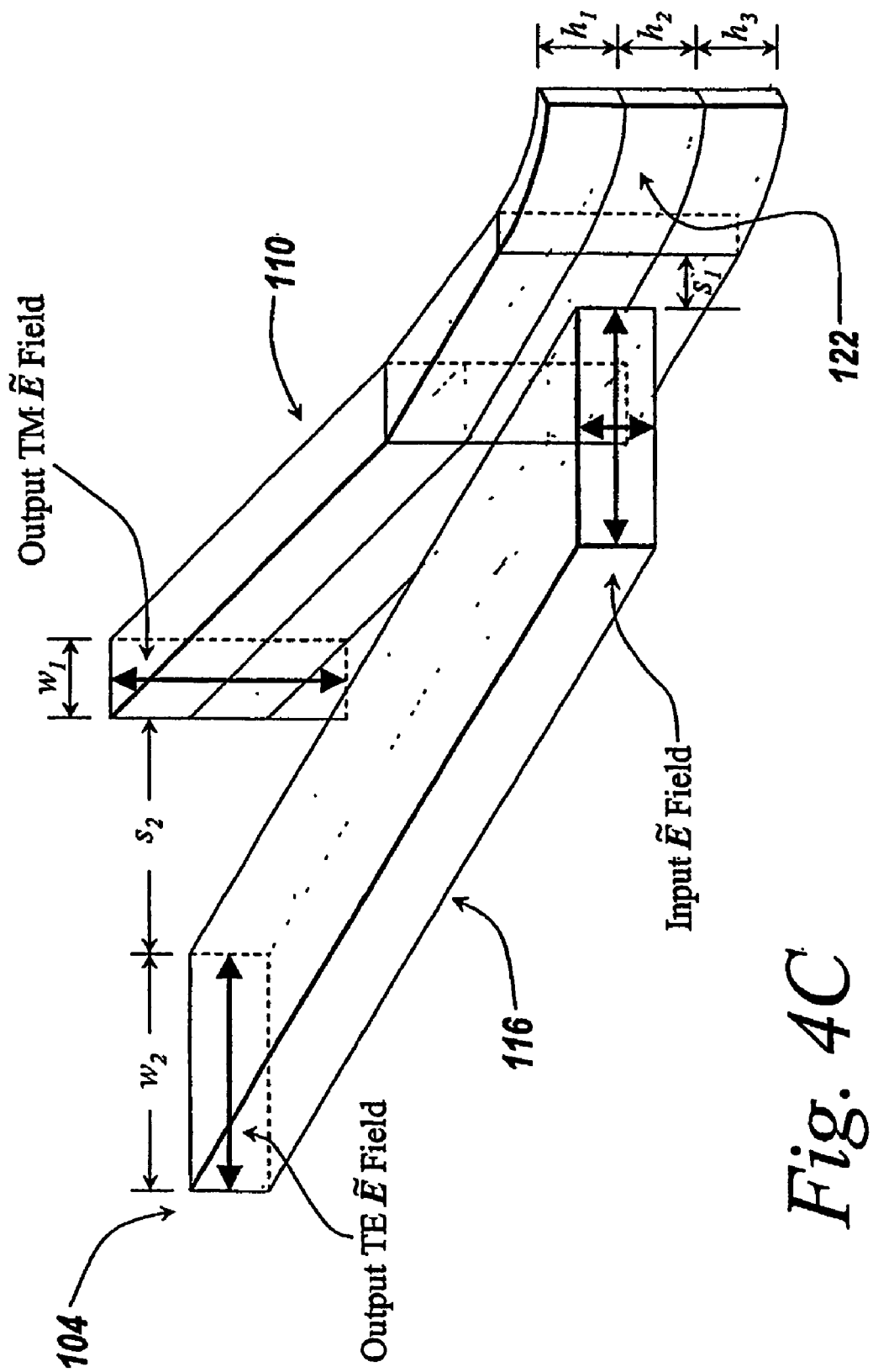

FIGS. 4A–4C are diagrams of polarization splitters 100, 102, and 104 in which the vertically 106, 108, and 110 and horizontally oriented waveguides 112, 114, and 116 do not have a point of intersection. Although in theory the performance of the device depicted in FIG. 1 is nearly ideal, when fabricated some rounding may occur in the region where the two waveguides intersect. This rounding will only occur in the middle layers 118, 120, and 122 and is a result of the limited resolution of optical lithography.

However, the impact on performance may be substantial as this would lead to a rather abrupt junction in the waveguides 10 and 12 of FIG. 1. Hence, it would be desirable to remove the intersection point. This can be accomplished by keeping the middle layers 118, 120, 122 of the vertically oriented waveguides 106, 108, and 110 separated from the horizontally oriented waveguides 112, 114, and 116 by a small gap $s_1$. So long as the gap $s_1$ is greater than the resolution limit of the lithographic system, the fabrication error will be removed. Note that the dimensions of the vertically oriented waveguide 106, 108, and 110 and horizontally oriented waveguide 112, 114, and 116 are similar to those described for vertically oriented waveguide 12 and horizontally oriented waveguide 10 in FIG. 1. Note that the vertically oriented 106, 108, and 110 and horizontally oriented waveguides 112, 114, and 116 are separated by a distance $s_2$.

FIGS. 4A–4C demonstrate a few of the many ways in which to transition into the inventive polarization splitter with a gap between the guides in the middle layers 118, 120, and 122. In particular, FIG. 4A tapers the vertically oriented waveguide 106 to transition the input modes into the polarization splitter adiabatically. In FIG. 4B the various pieces of the core in the layers 130, 120, 134 forming the vertically oriented waveguide 108 are separately and adiabatically brought into proximity with the horizontally oriented waveguide 114 so as to ensure that both the fundamental TE and TM modes originate in the horizontally oriented waveguide 114. Finally, in FIG. 4C, a reduced width vertically oriented waveguide 110 is brought into proximity with the horizontally oriented waveguide 116 and subsequently tapered into the full width structure again assuring that the fundamental modes originate in the input horizontally oriented waveguide 116.

All of these approaches work on the same principle. The modes of the input waveguide must be adiabatically transitioned in the inventive polarization splitter wherein the orthogonally oriented waveguides are in close proximity. The approach taken will typically depend on the fabrication technology utilized. These geometries represent just a few of the many possible ways of coupling to the inventive polarization splitter. The waveguide sections need not be rectangular in geometry and the core layers need not have the same refractive indices or geometry.

Figure 5:
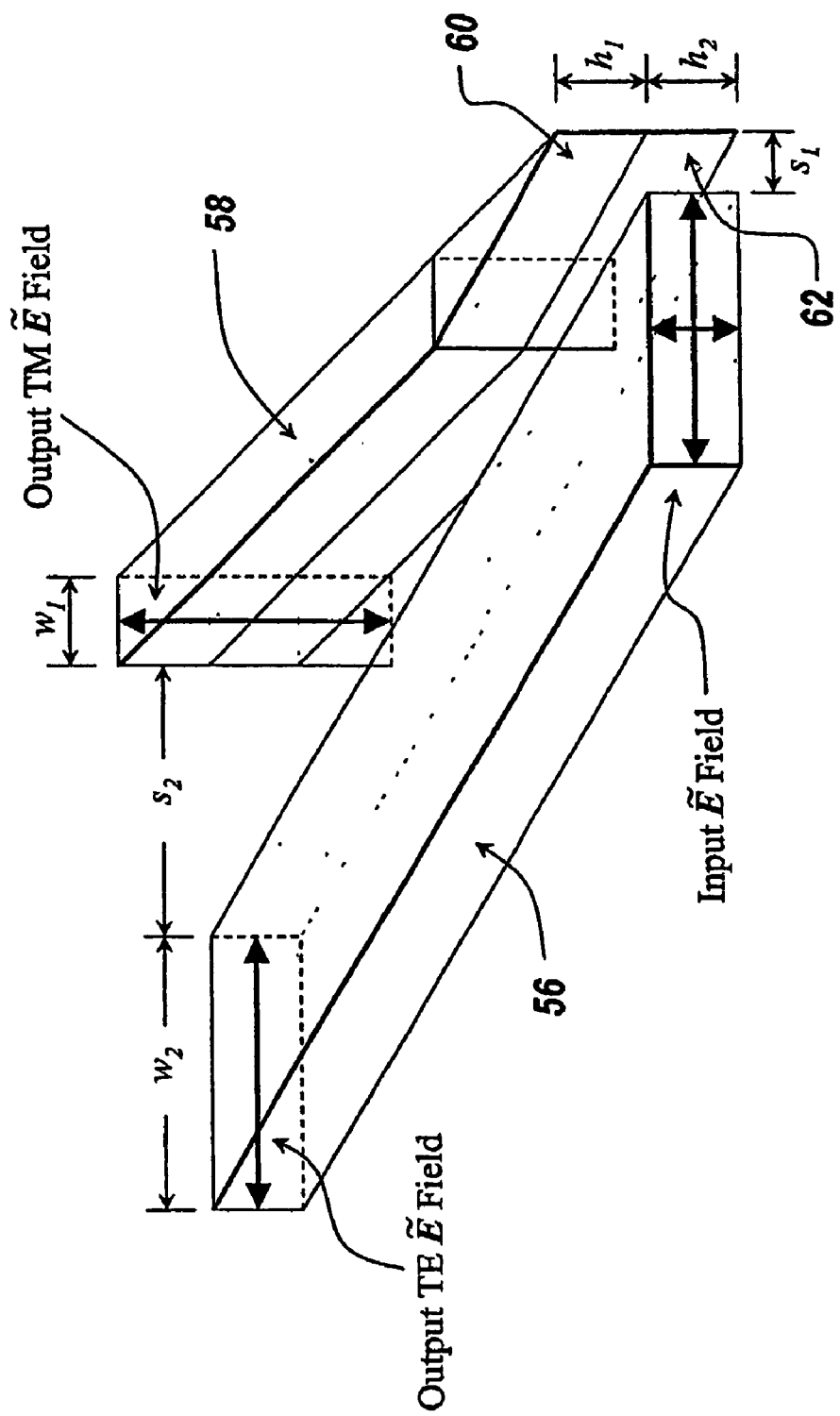
FIG. 5 is a schematic diagram of a polarization splitter utilizing only two core layers with a gap between the middle core layers of the vertically and horizontally oriented waveguide elements.

FIG. 5 shows a polarization splitter 54 which requires only two core layers 60, 62 to fabricate. In this embodiment, the vertically oriented 58 and horizontally oriented 56 waveguides are no longer centrally intersected. As a result, the fundamental TE and TM modes couple to one another. However, this coupling may again be mitigated by ensuring the fundamental modes propagate at different rates and have a chance to de-phase before substantial power exchange occurs. This is accomplished by making the horizontally oriented 56 and vertically oriented 58 waveguides different sizes. The performance of the device is unaffected by the ordering of the layers (i.e. which layer sits on top). Note that the two core layers 60, 62 have heights $h_1$, $h_2$. The structure also leaves a gap $s_1$ between the orthogonally oriented waveguides at the input to facilitate fabrication. At the output the vertically oriented waveguide 58 and horizontally oriented waveguide 56 are separated by a distance $s_2$. In addition, the horizontal waveguide 56 has a width $w_2$ and height $h_2$, and the vertical waveguide 12 has a width w and height that is the sum of $h_1$ and $h_2$.

It is important to note that many variations of the described embodiment are possible. The waveguide sections need not be rectangular in geometry and the core layers need not have the same refractive indices or geometry.

Figure 6A:
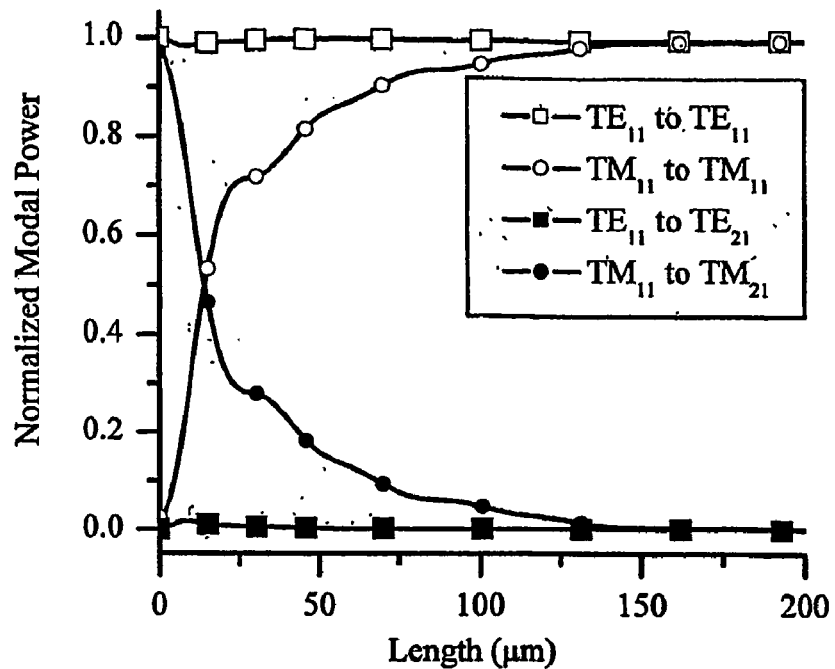
FIGS. 6A–6B are graphs demonstrating the performance of the polarization splitter depicted in FIG. 5.
Figure 6B:
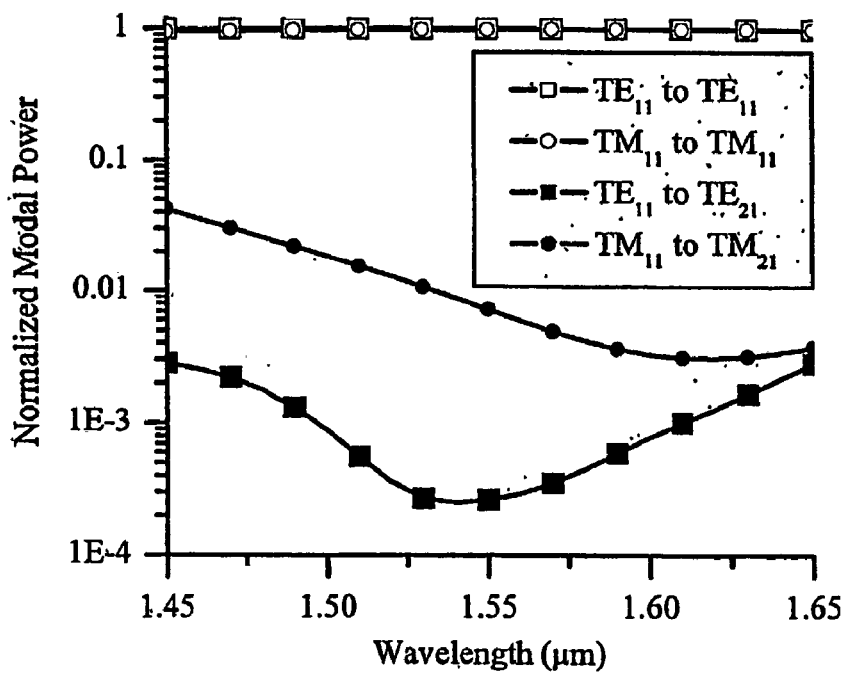

FIGS. 6A–6B are graphs of mode-scattering and FDTD simulations, respectively, of the performance of the device depicted in FIG. 5. In this particular embodiment, the core refractive index is 2.2 and the cladding index is 1.445. The layer thicknesses are each 0.4 μm and the guide widths are 0.35 μm and 0.8 μm for the vertically and horizontally oriented waveguides, respectively. The input and output separations of the guides are chosen to be $s_1$=0.25 μm and $s_2$=1.0 μm, respectively.

In particular FIG. 6A shows the performance of the device depicted in FIG. 5 as a function of the device length at a wavelength of 1.55 μm. The graph shows that for lengths over 150 μm, the performance of this two layered polarization splitter is nearly ideal. FIG. 6B demonstrates the performance of the device depicted in FIG. 5 as a function of wavelength for a device length of 143 μm. FIG. 6B shows that the device is largely wavelength insensitive with very little cross-talk ($TE_{11}$ to $TE_{21}$ and $TM_{11}$ to $TM_{21}$ coupling) over the entire 1.45 μm to 1.65 μm regime.

Figure 7A:
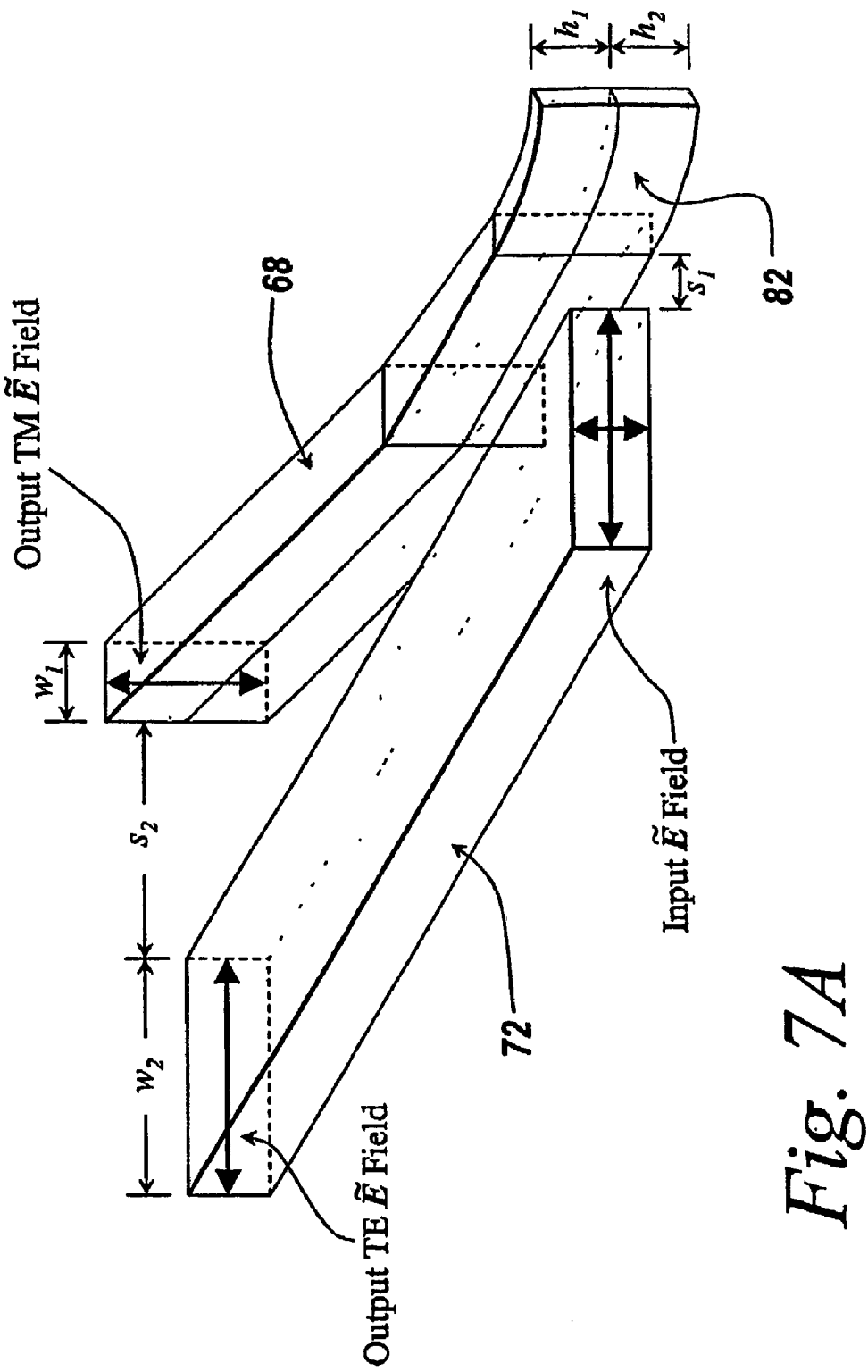
FIGS. 7A–7B are schematic diagrams of polarization splitters utilizing two core layers with alternate transition regions into the structure.
Figure 7B:
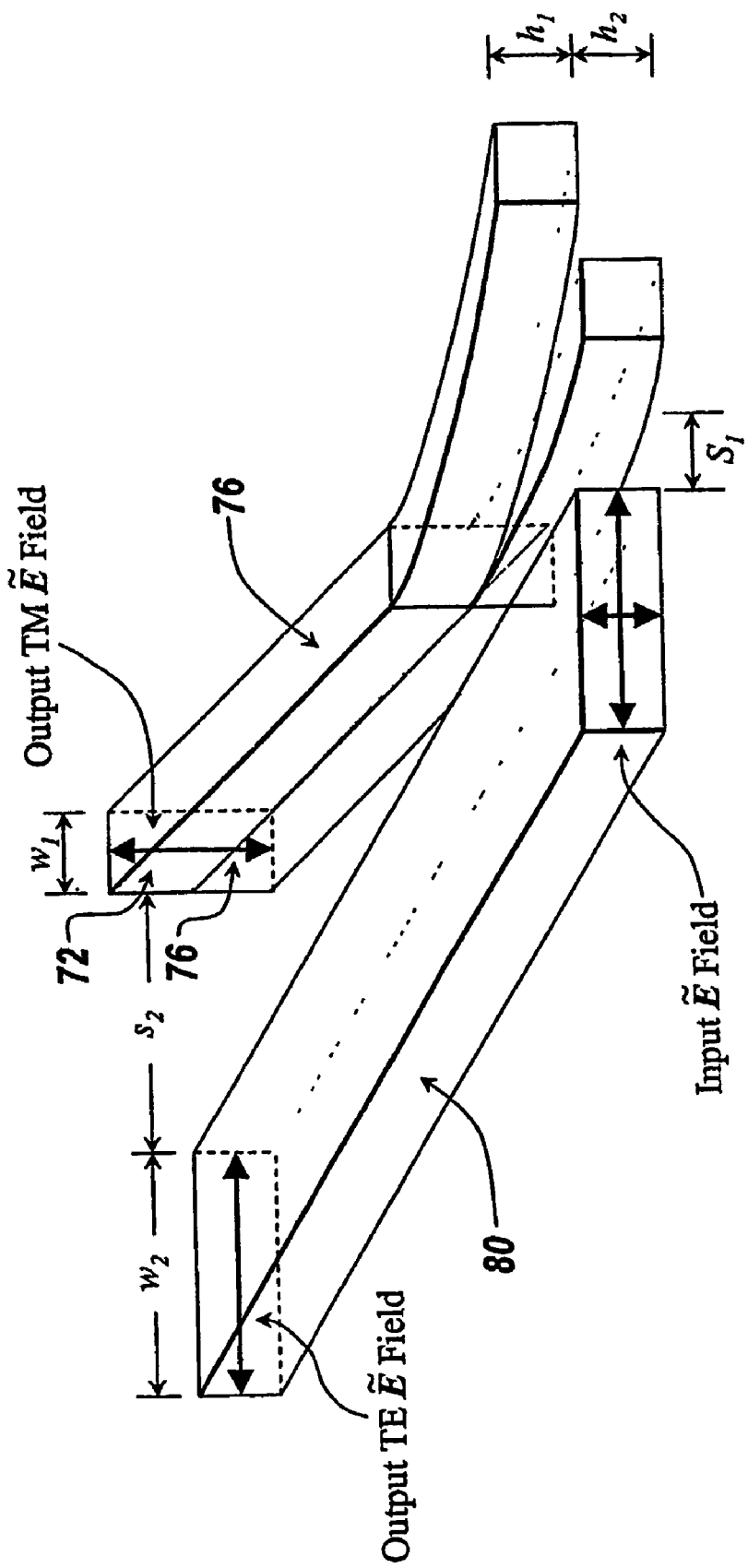

FIGS. 7A–7B demonstrate a couple of the many ways in which to transition into the inventive two layer polarization splitter with a gap $s_1$ between the guides in the middle layers 82, 84. The approaches are analogous to those taken in a three layer device. In FIG. 7A, a reduced width vertically oriented waveguide 68 is brought into proximity with the horizontally oriented waveguide 66 and subsequently tapered into the full width structure. In FIG. 7B the various layers 72, 74 forming the vertically oriented waveguide 76 are separately and adiabatically brought into proximity with the horizontally oriented waveguide 80. Again, each of these approaches has advantages and disadvantages with respect to fabrication, but all work on the same principle. The modes of the input waveguide must be adiabatically transitioned into the inventive polarization splitter by gradually bringing the orthogonally oriented waveguides into close proximity. The approach taken will typically depend on the fabrication technology utilized. These geometries represent just a few of the many possible ways of coupling to the inventive polarization splitter. The waveguide sections need not be rectangular in geometry and the core layers need not have the same refractive indices or geometry.

Importantly, the principle of reciprocity ensures that all of the aforementioned embodiments will act as polarization combiners when run in reverse.

Although the present invention has been shown and described with respect to several preferred embodiments thereof, various changes, omissions and additions to the form and detail thereof, may be made therein, without departing from the spirit and scope of the invention.

What is claimed is:

1. An integrated optic polarization splitter comprising:
   an input waveguide element that is configured to receive in input an optical signal having TE and TM components;
   a geometrically vertically oriented waveguide element coupled to said input waveguide element that is configured to propagate said TM component of said optical signal, said vertically oriented waveguide element including a plurality of core layers; and
   a horizontally oriented waveguide element coupled to said input waveguide element that is configured to propagate said TE component of said optical signal.

2. The integrated optic polarization splitter of claim 1, wherein said vertically oriented waveguide element and said horizontally oriented waveguide element intersect or nearly intersect in correspondence to the input waveguide element and adiabatically separate along the length of the polarization splitter.

3. The integrated optic polarization splitter of claim 1, wherein said plurality of core layers consists of two core layers.

4. The integrated optic polarization splitter of claim 3, wherein said vertically oriented waveguide element and horizontally oriented waveguide element have different sizes.

5. The integrated optic polarization splitter of claim 1, wherein said plurality of core layers comprises no more than three core layers.

6. The integrated optic polarization splitter of claim 1, wherein said vertically oriented waveguide element is tapered.

7. The integrated optic polarization splitter of claim 1, wherein said vertically oriented waveguide element and horizontally oriented waveguide element are rectangular waveguides.

8. The integrated optic polarization splitter of claim 1 wherein the cross section of the polarization splitter taken at a point along the length of the polarization splitter is not equal to the cross section of the polarization splitter taken at any other point along the length of the polarization splitter.

9. A method of forming an integrated optic polarization splitter, said method comprising:
    providing an input waveguide element that is configured to receive in input an optical signal having TE and TM components; and
    forming a geometrically vertically oriented waveguide element coupled to said input waveguide element that is configured to propagate said TM component of said optical signal, said vertically oriented waveguide element includes a plurality of core layers; and
    forming a horizontally oriented waveguide element coupled to said input waveguide element that is configured to propagate said TE component of said optical signal.

10. The method of claim 9, wherein said vertically oriented waveguide element and said horizontally oriented waveguide element intersect or nearly intersect in correspondence to the input waveguide element and adiabatically separate along the length of the polarization splitter.

11. The method of claim 9, wherein said plurality of core layers consists of two layers.

12. The method of claim 9, wherein said plurality of core layers comprises no more than three layers.

13. An optical waveguide splitter comprising:
    a pair of waveguide elements with a first waveguide element having a horizontal orientation and a second waveguide element having a geometrically vertical orientation formed from a plurality of waveguide core layers, wherein said first and second waveguide elements are intersected or nearly intersected at one end of the structure and separated at the other end of the structure with the transition there between made to be adiabatic;
    said waveguide elements being configured to receive an optical signal having both a TE component and a TM component and to propagate said TE component along the horizontally oriented waveguide element and said TM component along the vertically oriented waveguide.

* * * * *